United States Patent [19]

Faber et al.

[11] 4,408,558

[45] Oct. 11, 1983

[54] REPAIR APPARATUS

[75] Inventors: Dolan D. Faber, Akron; Richard G. Holmes, Wadsworth; Joseph J. Varano, Hartville, all of Ohio

[73] Assignee: The General Tire & Rubber Company, Akron, Ohio

[21] Appl. No.: 400,527

[22] Filed: Jul. 21, 1982

Related U.S. Application Data

[63] Continuation-in-part of Ser. No. 370,873, Apr. 22, 1982.

[51] Int. Cl.³ ............................................... B05C 11/02
[52] U.S. Cl. ...................................... 118/59; 118/101; 156/583.3; 219/243; 425/11
[58] Field of Search .................... 118/59, 101; 425/11, 425/26, 27; 264/36; 156/94, 98, 583.3, 583.7, 583.9; 219/243, 228

[56] References Cited

U.S. PATENT DOCUMENTS

| | | | |
|---|---|---|---|
| 3,454,741 | 7/1969 | Stewart | 156/583.7 X |
| 4,016,021 | 4/1977 | LaFleur | 118/583.3 X |
| 4,223,204 | 9/1980 | Benedict | 219/243 |

Primary Examiner—John P. McIntosh

[57] ABSTRACT

An apparatus useful in repairing molded thermoset FRP parts is disclosed having means for applying heat and pressure to a defect in the FRP containing a repair material while the FRP part is substantially rigidly held on a nest or support.

3 Claims, 7 Drawing Figures

REPAIR APPARATUS

This application is a continuation-in-part of co-pending U.S. patent application Ser. No. 370,873, filed Apr. 22, 1982, Faber, Holmes and Varano, entitled "Method For Repairing Glass Fiber Reinforced Plastic Parts."

This invention relates to an apparatus useful for repairing plastic parts such as FRPs (fiberglass reinforced thermoset plastic parts).

BACKGROUND OF THE INVENTION

During the process of molding and handling of fiberglass reinforced thermoset plastic parts (FRPs) surface defects may occur because a piece of dirt or flash may have gotten into the mold, incomplete curing, scratches, cracks, because the part may have been dropped, because a tool may have accidentally fallen on the part or because of damage during shipping and the like. These problems can occur not only on the original molded FRP part but also during and after in-mold coating the FRP where also incomplete coverage of the substrate may have occurred. These problems become serious when the part is to be electrostatically coated or painted, especially where the part is to be mounted on a vehicle chassis prior to electrostatically painting.

OBJECTS

An object of the present invention is to provide an apparatus for the repair of FRP parts, particularly those which subsequently will be electrostatically painted.

These and other objects and advantages of the present invention will become more apparent to those skilled in the art from the following detailed description and accompanying drawings.

SUMMARY OF THE INVENTION

According to the present invention an apparatus is provided in which a movable member can be pressed against a FRP part which is rigidly held or supported by a nest. The FRP part to be repaired contains a defect or void which is filled with a repair material. The movable member is pressed against the FRP part at the defect area while heat is applied for a period of time sufficient to cure the repair material. The apparatus of the present invention is useful for repairing FRP parts and in-mold coated FRP parts.

DETAILED DESCRIPTION

Figure 1:
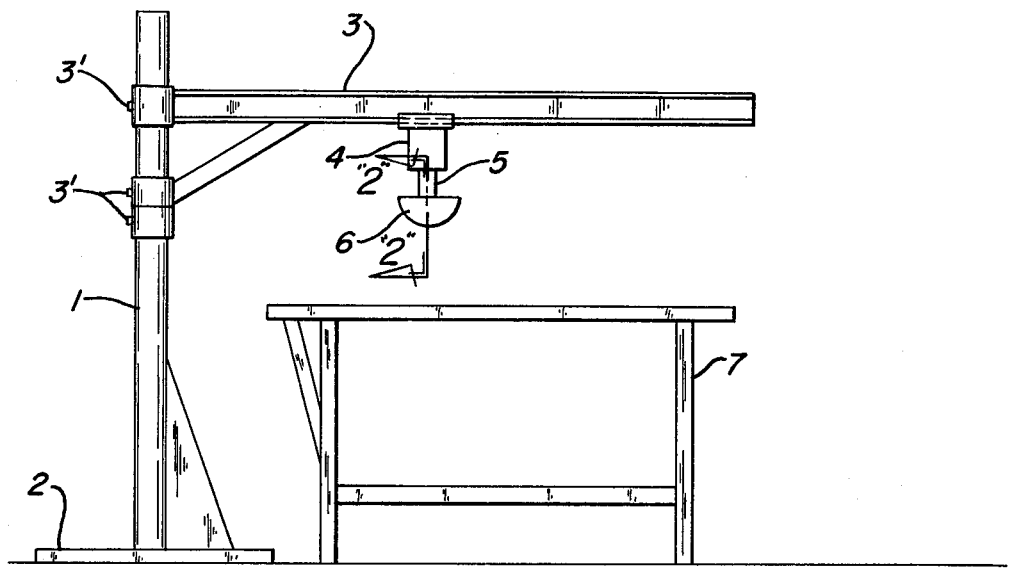
FIG. 1 is a schematic and vertical view of the apparatus of the present invention.

In FIG. 1 there schematically and vertically is shown post or stand 1 mounted on support 2 containing arm 3 which can move vertically on or horizontally about stand 1 by electrical, hydraulic or mechanical means not shown. Arm 3 can be held in position on support 2 by means of set screws 3′,3′. Air cylinder 4 is slidably mounted to move horizontally back and forth on arm 3 and contains vertically movable piston 5 to which is attached shape conforming pad 6 which may contain air, sand, oil or other material to enable the pad to conform to the part being repaired. The pad is rotatable on the piston to which it is attached and further contains a universal joint connection (not shown) to enable the pad to be tilted to adjust further to the surface of the part to be repaired of the FRP molding. Shape conforming nest or stand 7 is positioned under arm 3 and pad 6 and supports the part which is to be repaired.

Figure 2:
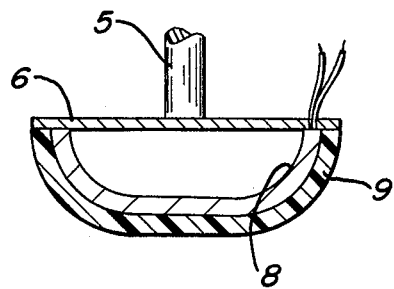
FIG. 2 is a vertical cross-sectional view of the flexible pressure pad of FIG. 1.

In FIG. 2 there is shown a vertical cross sectional modification of pad 6, along the lines 2″—2″ of FIG. 1, in which there is provided on the pad electrically heated mantle 8 and outer inert or non-adhesive layer 9 of MYLAR (polyethylene terephthalate, duPont) or TEFLON (polytetrafluoroethylene, duPont) and the like.

Figure 3:
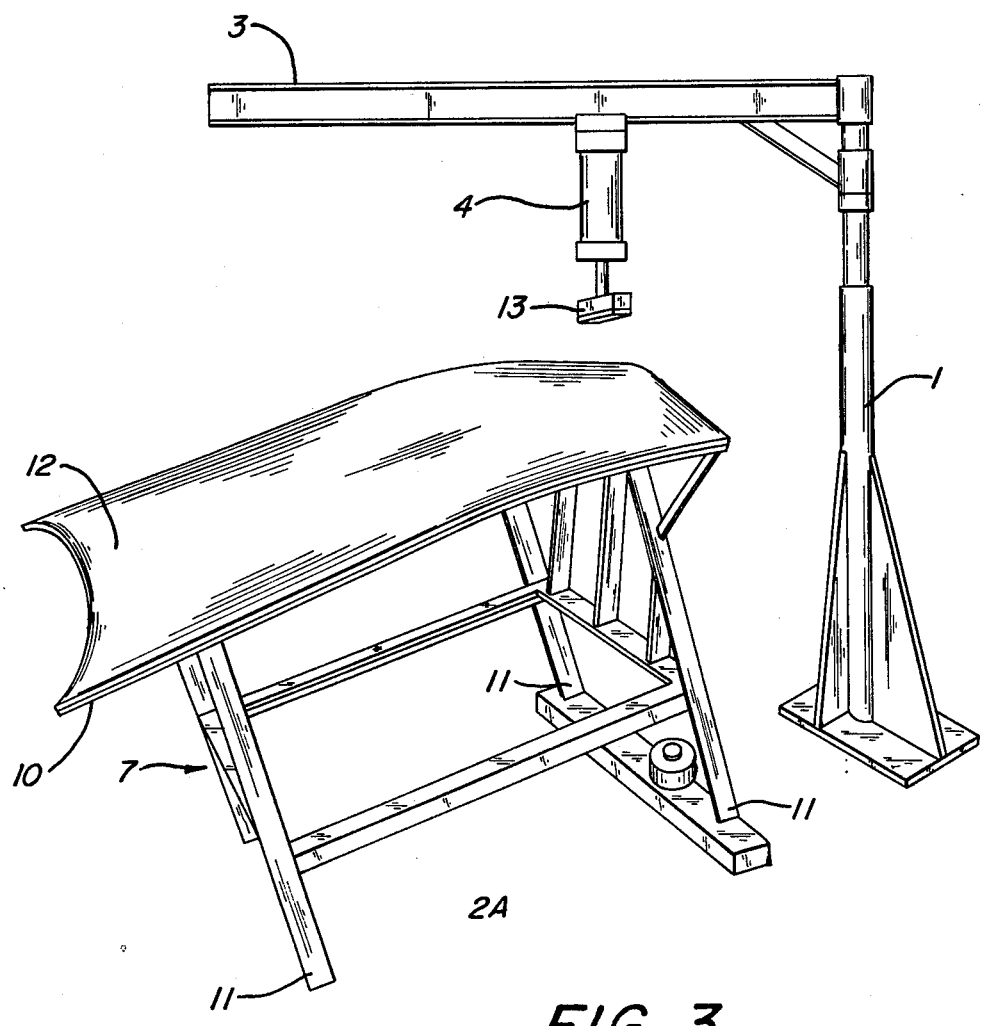
FIG. 3 is a partly perspective and vertical view of the apparatus of the present invention wherein an FRP part to be repaired is on a nest or support.

FIG. 3 is a partly perspective and vertical view of the surface 10 of next 7 which conforms to the inner surface of FRP part 12 which is laid on the top of surface 10 in a position to be repaired. Nest 7 is shown of rigid or sturdy construction to hold FRP part 12 and withstand the force of piston 5 and pressure applying member 13. While nest 7 is shown as slightly fixably tilted, its legs 11 can be attached to hydraulic pistons or to adjustable (screw) height extentions (not shown) based in floor 2A to adjust nest 7 to any desired angle for proper use. Surface 10 can be fixed or removed from the reinforcing part of nest 7 so that different surfaces 10 conforming to other and differently contoured FRP molded parts can be accommodated and repaired. However, separate nests having a surface conforming to each FRP molding can be used.

Figure 4:
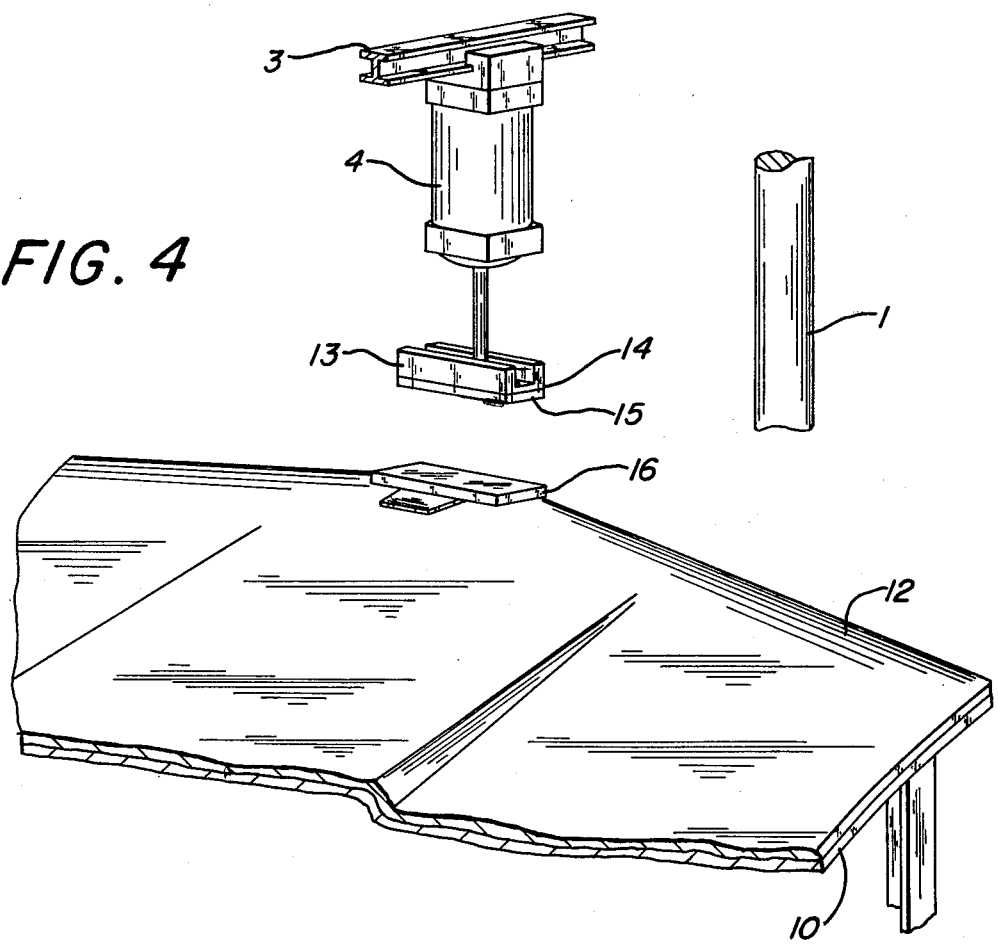
FIG. 4 is a perspective vertical partly cross-sectional view showing a modified movable pressing member in a position to operate against the FRP part ready to be repaired and supported by the nest.

FIG. 4 is a partly perspective and vertical view showing the apparatus in position to repair a portion of FRP part 12. Here pressure pad 6 has been replaced with pressure applying rigid U-shaped member 13 having flat surface 14 containing resilient member 15 which may be of a stiff textile or preferably of a stiff flexible synthetic rubber or plastic foam or sponge. While member 13 is shown as being of elongated U-shape, it can be of other configurations so long as in such modification its bearing surface is flat. A piece of deformable semi-rigid foam 16, which may be disposable, is shown on top of FRP part 12.

Figure 5:
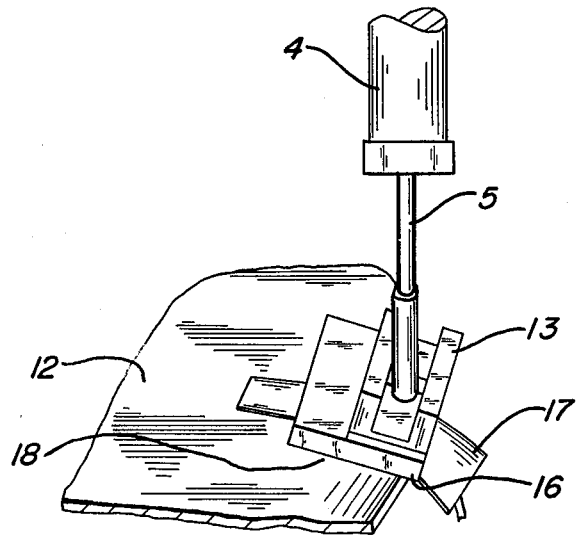
FIG. 5 is a perspective vertical view of the movable pressure member applied against the surface of the FRP part.

FIG. 5 is a partly perspective and vertical view showing application of member 13 against FRP part 12. Beneath semi-rigid foam 16 is heating mantle 17. Not shown and disposed beneath heating mantle 17 is a piece of shim stock (0.015 inch steel sheet), and disposed beneath the shim stock is sheet 18 of MYLAR which is immediately over the defect in the FRP surface and which contains the FRP repair material (not shown).

Figure 6:
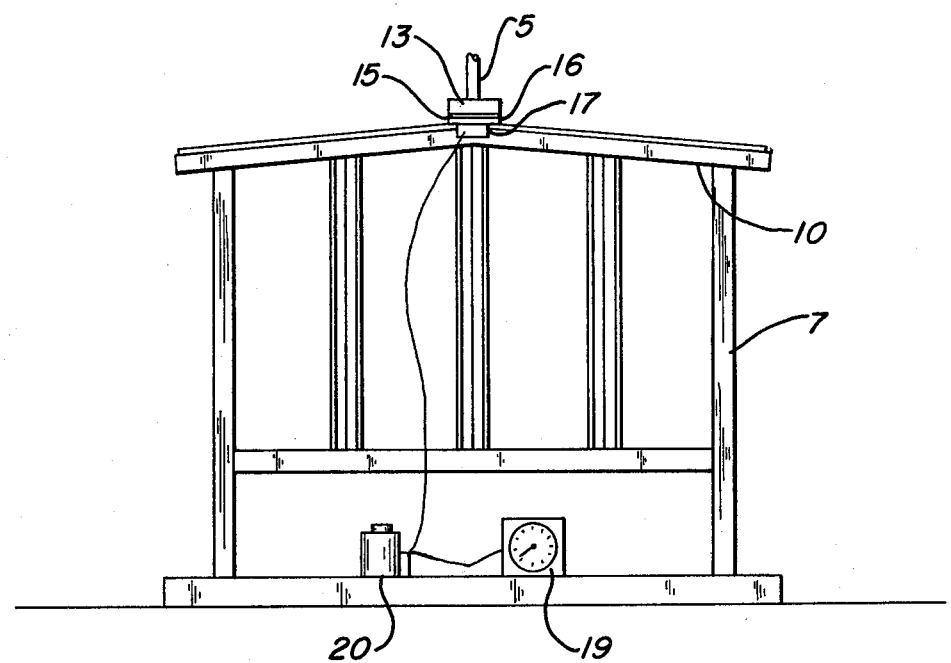
FIG. 6 is a vertical view of the nest or support for the FRP part showing some of its components and FIG. 7 is a perspective vertical view showing the pressure member has been retracted from the surface of the repaired FRP part.

FIG. 6 is partly perspective and vertical view showing timer 19 connected to rheostat 20 for controlling the electricity to heating mantle 17.

Figure 7:
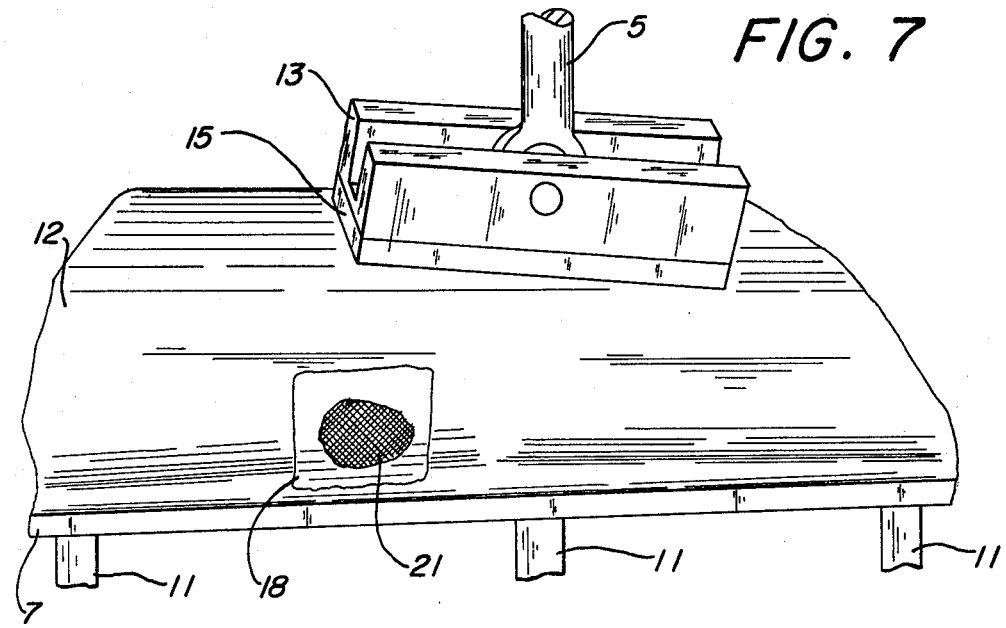

FIG. 7 is a partly perspective and vertical view of an FRP part after being repaired and after retraction of member 13 and removal of the shim stock, heating mantle 17 and deformable semi-rigid foam 16. The MYLAR sheet 18 is still over the repaired void 21 which is shown as circular and darker than the FRP part since the repair material contains a conductive carbon black.

The glass fiber reinforced thermoset plastic (FRP) molding to be repaired can be a thermoset polyester resin or vinyl ester resin and glass fiber composition. It can be a sheet molding compound (SMC) or a bulk molding compound (BMC), or other thermosetting FRP material as well as a high strength molding compound (HMC) or a thick molding compound. The FRP can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semi-rigid (may contain a flexibilizing moiety such as an adipate group in the polyester). The substrate, also may contain other flexibilizing polymers, the elastomers and plastomers, such as the styrene-butadiene block copolymers. Unsaturated polyester glass fiber thermosets are known as shown by "Modern Plastics Encyclopedia," 1975–1976, October, 1975, Vol. 52, No. 10A, McGraw-Hill, Inc., New York, pages 61, 62 and 105 to 107; "Modern Plastics Encyclopedia," 1979–1980, October, 1979, Volume 56, No. 10A, pages 55, 56, 58, 147 and 148 and "Modern Plastics Encyclopedia," 1980–81, October, 1980, Volume 57, No. 10A, pages 59, 60 and 151 to 153, McGraw-Hill, Inc., New York, N.Y. For information on vinyl ester resins see "Heat Resistant Vinyl Ester Resin," M. B. Launikitis, Technical Bulletin, SC:116-76, Shell Chemical Company, June, 1976, and Shell Chemical Company Technical Bulletins SC:16-76 and SC:60-78.

With respect to molding FRP parts and in-mold coating FRP parts injection or compression, transfer molding, or other molding apparatus or machines can be used. Molding apparatus and methods may be found in U.S. Pat. Nos. 4,076,780; 4,076,788; 4,081,578; 4,082,486; 4,189,517; 4,222,929; 4,245,006; 4,239,796; 4,239,808 and 4,331,735, and in U.S. patent applications Ser. No. 316,592, filed Nov. 2, 1981 and Ser. No. 313,213 filed Nov. 20, 1981. Please see, also, "Proceedings of the Thirty-Second Annual Conference Reinforced Plastics/Composites Institute," SPI, Washington, February, 1977, Griffith et al., Section 2-C, pages 1–3 and "33rd Annual Technical Conference, 1978 Reinforced Plastics/Composites Institute The Society of the Plastics Industry, Inc.," SPI, Ongena, Section 14-B, pages 1–7.

A repair material useful in the practice of the present invention is disclosed in U.S. patent application Ser. No. 370,873 mentioned supra, the disclosure of which is incorporated herein and made a part hereof by reference to the same. The repair material comprises generally a thermosetting composition of a polyurethane based oligomer, an epoxy based oligomer or a polyester based oligomer or mixture thereof plus cross-linking monomers, low-shrink additives, certain salts, catalysts and a conductive carbon black and so forth.

To repair a cured FRP part, the FRP part is placed on the nest. The gouge or defect in the surface of the FRP part (which may have been in-mold coated with a thermosetting conductive in-mold coating) is cleaned out by scraping, routing, or debridement of loose substrate. The surface should be dust, grease and foreign material free, by wiping, cleaning and so forth.

The liquid repair material is then applied to the defective area in a manner to squeeze the air from the defects recessed areas. There should be an excess of the repair material over the defective area.

A piece of MYLAR film is laid over the wet repair material so that it does not entrap air between the MYLAR film and the liquid repair material. A piece of shim stock is placed over the MYLAR film. A heating mantle is placed over the shim stock. A piece of semi-rigid foam is placed over the heating mantle. The heating mantle is then heated by means of rheostat 20, using timer 19, to provide heat for curing. The heating mat or mantle should be capable of generating at least about 280° F. (138° C.) after 5 minutes of applied voltage at 67–68 volts A.C. Then pressure is applied by means of member 6 or 13. Pressure is critical to this technique. It has been found that to avoid any substantial shrinkage a range of from about 26 to 50 psi is effective with from about 36 to 50 psi being better. Lower pressures below 36 psi can be used provided the repair material has been thoroughly degassed and has not been allowed to redissolve any air. The lower pressures usually are not as reliable and the subsequent repairs exhibit a tendency for greater shrinkage rates during subsequent baking operations. After about 5 to 20 minutes at a temperature of about 280° to 415° F. (138° to 213° C.) to cure the repair material, member 6 or 13 is retracted and the heat is turned off. The piece of foam, shim stock, heating mantle and MYLAR film are removed and the repaired area of the FRP part is allowed to cool to about 25° C. The repaired area can then be sanded back to the original part contour. Block sanding during the final stages is beneficial. Instead of finishing the part by sanding to return it to its original contour and remove excess repair material, grinders, cutters and other devices may be used to remove the excess of extraneous repair material, care being taken not to harm the surface of the FRP part.

After repairing, the defect should be difficult to feel. If there is a slight observable indication of where the defect was, this can generally be removed by standard sanding or standard finishing operations. The repaired area can now be painted or finished as desired with no further shrinkage. If there are any further slight indications of the defect (about 200 microinches), they can be buffed out or rubbed out after paint curing has been completed.

The apparatus of the present invention can be used in the repair of automobile parts such as grille and headlamp assemblies, deck hoods, fenders, door panels and roofs, as well as in the repair of food trays, appliance and electrical components, furniture, machine covers and guards, bathroom components, structural panels and so forth made from FRPs.

We claim:

1. An apparatus useful for the repair of molded thermoset FRP parts comprising a vertically disposed stand, an arm attached to said stand for vertical movement on and horizontal movement about said stand, pressure applying means slidably mounted on said arm for horizontal movement on said arm, said pressure applying means containing a vertically movable piston connected to a rotatable and tiltable pressure pad for applying pressure to an FRP part containing a defect having a repair material, an adjustable nest for substantially rigidly supporting a molded thermoset FRP part to be repaired under pressure from said pressure applying means, and means to provide heat to said FRP part where said pressure applying means is applied under pressure to the repair area of said part on said nest.

2. An apparatus according to claim 1 where the pressure pad comprises a shape conforming pad containing disposed therein shape conforming material, containing electrical heating means conforming to the contour of said pad and containing an outer cover adjacent said electrical means conforming to the contour of said pad and of an an inert, non-adhesive material.

3. An apparatus according to claim 1 where the pressure pad comprises generally a rigid flat surface containing an outer pressure applying resilient member.

* * * * *